United States Patent [19]

Richardson

[11] 3,977,493
[45] Aug. 31, 1976

[54] EXHAUST CONTROL METHOD AND APPARATUS

[76] Inventor: Kay Keith Richardson, 614 Park St., Baytown, Tex. 77520

[22] Filed: Nov. 1, 1973

[21] Appl. No.: 412,937

Related U.S. Application Data

[62] Division of Ser. No. 221,179, Jan. 27, 1972, Pat. No. 3,786,791.

[52] U.S. Cl. .................................. 181/42; 181/47 B
[51] Int. Cl.² ........................................... F01N 1/00
[58] Field of Search ............... 181/42, 44, 46, 47 R, 181/47 A, 47 B, 48, 33 C, 33 D, 33 E, 33 L, 33 HB; 60/312, 314, 273, 279; 123/65 EM

[56] References Cited
UNITED STATES PATENTS

| 1,874,326 | 8/1932 | Mason ............................... 181/48 X |
| 3,113,635 | 12/1963 | Allen et al. ........................... 181/42 |
| 3,212,603 | 10/1965 | Walker ....................... 181/33 D UX |
| 3,602,333 | 8/1971 | Kobayashi et al. ................... 181/42 |
| 3,754,619 | 8/1973 | McCormick ...................... 181/42 X |

Primary Examiner—John Gonzales
Attorney, Agent, or Firm—Pravel & Wilson

[57] ABSTRACT

An exhaust control method and apparatus for controlling the exhaust flow of an internal combustion engine to increase engine efficiency and power while suppressing the sound of the exhaust by both absorbing and canceling sound waves.

24 Claims, 4 Drawing Figures

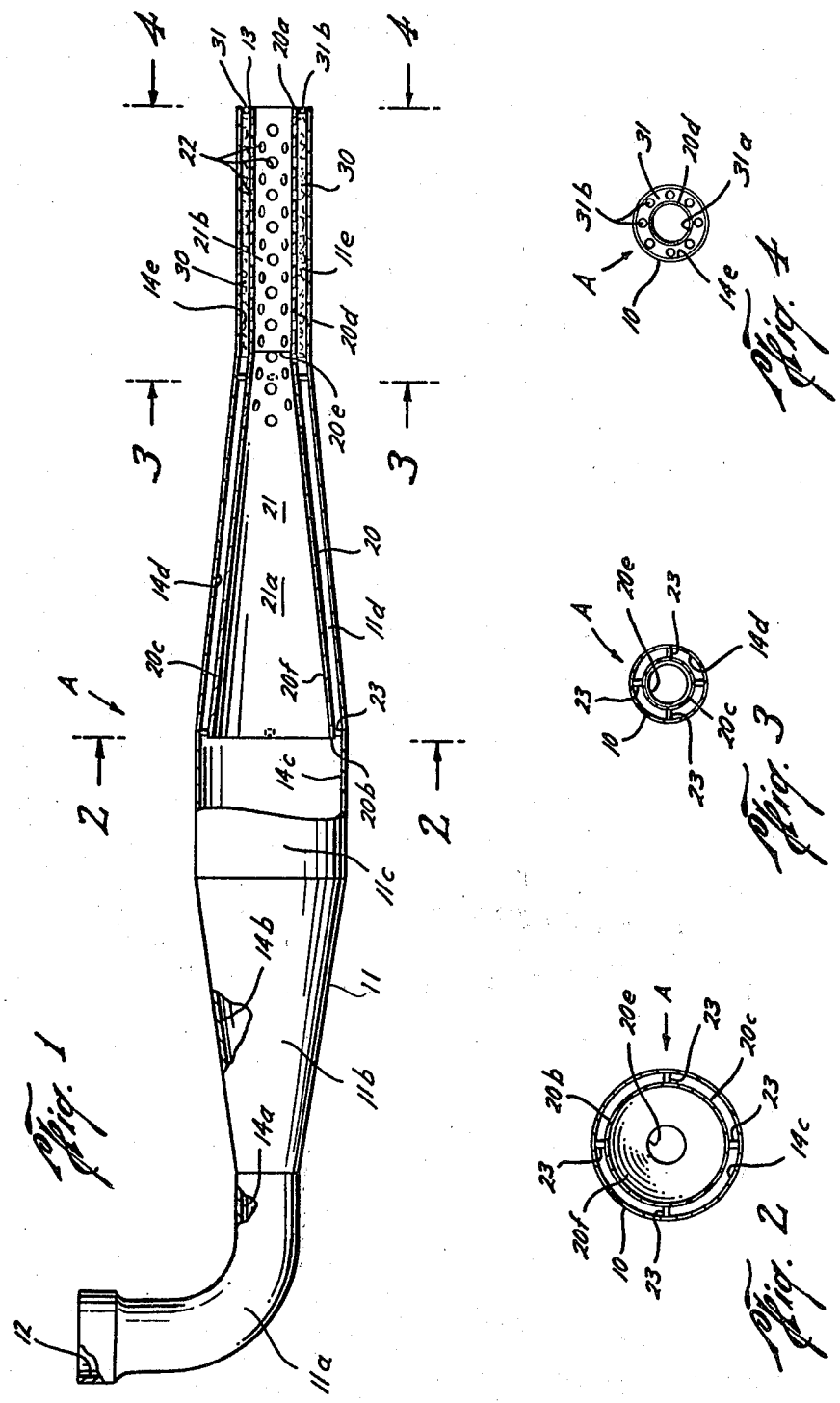

EXHAUST CONTROL METHOD AND APPARATUS

This is division of application Ser. No. 221,179, filed Jar. 27, 1972, now U.S. Pat. No. 3,786,791, issued Jan. 22, 1974.

BACKGROUND OF THE INVENTION

This invention relates generally to the field of an exhaust control method and apparatus and more precisely, but not by way of a limitation, to a new and improved motorcycle exhaust apparatus.

Internal combustion engine exhaust noise muffling or sound suppression has been accomplished in the prior art by either absorbing the sound pressure waves in some fashion or by canceling the waves with other waves from the same source while effecting a decrease in the velocity of the exhaust gases. Exhaust sound suppression produced a back pressure of the exhaust on the engine which adversely affected the engine's performance, reliability and efficiency, and which required that the exhaust flow resistance be made as small as possible. An increase of 1 psi in exhaust back pressure decreased the maximum power output of an engine by an average of 1½ percent. Back pressure was especially critical in muffing the exhaust of a motorcycle two-cycle engine, which operated at full load more frequently and was more sensitive to the exhaust control. With the adoption of the government regulations establishing maximum permissive noise levels for motorcycles, the need for an efficient motorcycle exhaust control apparatus became even more acute.

Typical prior art motorcycle exhaust muffling devices were illustrated and described in U.S. Pat. Nos. 2,492,784 and 3,482,648. Packing an annular area between an inner perforated conduit and a muffler shell with a packing of sound absorbing material was disclosed in U.S. Pat. No. 1,844,105, but only random flow and not a selected portion of the exhaust flow was directed into contact with the sound absorbing material. U.S. Pat. No. 3,434,280 disclosed a tunable motorcycle exhaust expansion chamber for reflecting a portion of the exhaust pressure wave to tune the chamber and contain the fresh charge of air-fuel mixture in the cylinder for increasing engine efficiency and power, but lacked any sound attenuating or muffling means. The disclosure of U.S. Pat. No. 1,611,475, employed a plurality of nozzles positioned in a series to reflect portions of the sound waves flowing therethrough for canceling other portions of the sound waves while U.S. Pat. No. 3,414,078 provided a tuned resonance muffler in which a standing wave was created in a closed chamber to combine with the exhaust flow for effecting a cancellation of the sound waves.

SUMMARY OF THE INVENTION

A new and improved exhaust control method and apparatus for controlling an internal combustion engine exhaust flow by providing a chamber for expanding the exhaust gases and enabling tuning of the engine for enhanced performance with a timed pressure wave reflected from a converging conduit concentrically positioned in the chamber and which also serves to separate the noise producing high frequency sound waves into an annular area which are directed through a sound absorbing material while being tuned to a standing wave to cancel the sound of the remainder of the flow.

An object of the present invention is to provide a new and improved exhaust control apparatus.

Another object of the present invention is to provide a new and improved exhaust control method.

A further object of the present invention is to provide a new and improved tuned exhaust control muffler.

BRIEF DESCRIPTION OF THE DRAWING

FIG. 1 is a side view, in section, of the exhaust control apparatus of the present invention; and FIGS. 2, 3, and 4 are views taken along lines 2—2, 3—3 and 4—4, respectively, of FIG. 1.

DESCRIPTION OF THE PREFERRED EMBODIMENT

The exhaust control apparatus, generally designated A in the FIGS., is preferably employed with a two-cycle internal combustion engine (not illustrated) for controlling the mixed exhaust fluid flow comprising a mixture of gases and vapors from the engine. While the exhaust apparatus A will be disclosed in the present application as used with the two-cycle engine, commonly found on motorcycles and the like, the present invention should not be considered so limited as it may be employed with the exhaust flow from any internal combustion engine with appropriate changes in size and shape as will become more readily apparent hereinafter.

As illustrated in FIG. 1, the exhaust control assembly A includes an outer housing or casing 10 having an apperture or chamber 11 formed therein which communicates with an exhaust port (not illustrated) of an internal combustion engine at an inlet opening 12 of the casing 10 and which flows or vents the exhaust flow produced by the engine back to the atmosphere through an outlet passage or opening 13. The inlet end 12 is preferably connected directly with the exhaust port to minimize the resistance to the exhaust flow in the exhaust control apparatus A for enhancing engine performance. The hollow casing 10 may be made of any suitable material and fabricated in any desired manner. Preferably, the casing 10 is made of thin-walled metal tubing for weight reduction and is fabricated by welding which also minimizes the weight of the apparatus A.

The casing 10 includes an inner surface 14 which defines and forms the chamber 11 into various shapes for controlling the exhaust flow as will be described in greater detail hereinafter. The inner surface 14 includes a constant diameter inlet nozzle section 14a adjacent the opening 12 providing a uniform cross-sectional flow area 11a of the chamber 11, a progressively expanding flow area portion 11b formed by a surface section 14b, a large constant diameter flow area portion 11c formed by a surface section 14c, a progressively reducing flow area portion 11d provided by the tapered surface 14d and a constant diameter outlet flow area portion 11e formed by a surface section 14e adjacent the outlet opening 13.

The exhaust control apparatus A includes an inner flow tube or conduit 20 having a longitudinally extending passage 21 extending therethrough and which is positioned to extend inwardly into the chamber 11 from an annular shoulder 20a adjacent the outlet opening 13 to an annular shoulder 20b located in the portion 11c of the chamber 11. The conduit 20 includes a tapered inlet portion 20c forming the inlet shoulder 20b and a constant diameter outlet portion or stinger 20d which join at 20e. The conduit 20 is also preferably formed of metal tubing and fabricated by welding. The tapered inlet portion 20c preferably in the form of a truncated, cone-shaped portion with the largest cross-sectional flow area of the portion 21a adjacent the end 20b and with an inner surface 20f of the cone 20c providing a convergent wall to form the progressively reducing flow passage cross-sectional area 21a leading into the constant diameter flow passage portion 21b. The conduit 20 is concentrically positioned in the casing 10 while enabling flow in the annular area therebetween to align the longitudinal axis of the flow passage 21 with that of the chamber 11 and is secured in such a relationship by suitable fastening means, such as by welding a set of radial spacers 23 between the casing 10 and the conduit 20. The conduit 20 includes a plurality of perforations or openings 22 therethrough spaced along the exit portion of the inlet portion 20c and the length of the stinger 20d for communicating the flow passage 21 with the annular chamber portions 11d and 11e of the chamber 11 adjacent the outlet opening 13.

The exhaust control apparatus A includes a packing 30 of sound absorbent material formed by a disorderly mass of non-inflammable fibers such as fiberglass and the like, positioned in the annular area between the casing 10 and the conduit 20 in the constant diameter portion 11e of the chamber 11.

As illustrated in FIG. 4, the packing 30 is held in the chamber 11 by an annular retainer ring 31 located in the outlet opening 13 having a central opening 31a for fitting the ring 31 about the stinger 20d and a plurality of spaced exhaust ports 31b for flowing the exhaust gases in the annular area between the casing 10 and the conduit 20 to atmosphere the opening 13.

In the use and operation of the present invention, the exhaust gases and vapors from the internal combustion engine will be communicated into the chamber 11 through the opening 12 and exhausted from the chamber 11 through the outlet opening 13 back to the atmosphere. When the exhaust port of the internal combustion engine opens or the piston skirt (not illustrated) uncovers the exhaust port, plurality of noise producing pressure waves will be expelled or pulsed from the cylinder which will be recieved in the chamber 11 at the opening 12. These waves will then be communicated through the constant diameter flow portion 11a of the chamber 11 to the progressively increasing cross-sectional flow area portion 11b of the chamber 11. In flowing through the portion 11b of the chamber 11, the exhaust gases and vapors are enabled to expand for reducing the pressure of the exhaust gases. In expanding, the flow, however, it has been determined that the lighter gases, having the greater noise producing high frequency pressure waves, tend to expand more rapidly than the heavier gases having the less objectional noise producing lower frequency pressure waves which is probably due to the greater inertia of the heavier gases. The flow of the lighter gases is substantially separated from the remainder of the exhaust gas pressure wave flow by the leading edge 20b of the conduit 20 which directs the flow of the lighter gases into the annular area of the chamber 11 between the casing 1 and the conduit 20. The flow of the heavier gases, having the lower frequency pressure waves, continues into the progressively reducing cross-sectional area portion 21a of the flow passage 21 where they are brought into contact with the inner surface 20f of the conduit 20 for partially reflecting the pressure wave or waves. The rebounding pressure waves from the reflecting surface 20f have generally the same wave length but an opposite pressure distribution along the longitudinal axis of the chamber 11 and will provide some interference to mutually cancel one another or at least considerably weaken one another for effecting some sound suppression.

The heavier gases are also turned by the conduit 20 by the tapered inlet portion 20c by setting the reflecting surface 20f a specified distance along the longitudinal axis of the chamber 11 from the piston skirt or the exhaust port to return a portion of the pressure wave to the exhaust port immediately prior to closing the exhaust port. The pressure wave velocity of approximately 1640 feet per second may be determined from the exhaust gas temperature as it will be the same as the speed of sound in the gas at that temperature. By knowning the velocity of the pressure wave, the desired nominal engine operating speed in revolutions per minute and the portion of each engine revolution in degrees of rotation for which the exhaust ports are open, the time for the pressure wave to travel to the reflecting surface 20f and back to the exhaust port or piston skirt of the engine immediately prior to the closing of the exhaust port may be determined. For example, with the wave velocity of 1640 feet per second, a desired nominal engine speed of 7,000 revolutions per minute and the exhaust port open for 140° for each 360° revolution, the pressure wave travel time would be 1640 feet per second times sixty seconds per minute divided by 7,000 revolutions per minute times the 140° divided by 360° per revolution which equals 1/300th of 0.0033 of a second. With both the total wave traveling time and the wave velocity known, the distance the reflecting surface 20f is to be located from the exhaust port is next determined. For example, with the wave velocity of 1640 feet per second, and a total travel time of 1/300ths of a second, the total travel distance would be 5.46 feet which would mean that the reflecting surface 20f should be located half the 5.46 feet distance from the piston skirt or the exhaust port or 2.73 feet therefrom. By locating the reflecting surface 20f slightly nearer the exhaust port, the reflected wave will be partially reflected as a positive pressure wave and timed for containing the unburnt fuel-air mixture within the cylinder immediately before the exhaust port is closed. This feature is particularly desirable in use with the two-cycle engine which breathes on every stroke of the piston. By reflecting a portion of the exhaust gas pressure wave in tuning the chamber 11, the flow surge is dampened and a more uniform discharge flow rate from the opening 13 to atmosphere is achieved for further suppressing the sound of the exhaust gases.

Reflecting surface 20f by reflecting the pressure wave tunes the chamber 11 to dominant or basic harmonic frequency and which creates a negative pressure wave passing out the flow passage 21b of the conduit 21.

Returning now to the flow of the lighter gases having high frequency pressure waves, which have been separated from the heavier gases into the annular area between the casing 10 and the conduit 20. These gases will move with minimum flow resistance into the constant diameter annular portion 11e of the chamber 11 where they are directed to come into contact with the sound absorbing packing 30. It is well known that the packing 30 is more efficient in suppressing the sound of the greater decibel producing high-pitch or high-frequency sound waves than the low frequency sound producing vibrations or pressure waves.

Flow of the heavier gases through the progressively decreasing flow passage 21a also tends to increase the pressure of these gases which is minimized by venting or flowing a portion of the heavier gases through the openings 22 into the annular chamber area 11e where they are mixed for effecting harmonic cancellation of the exhaust gas sound. These gases, as well as the ligher gases, are directed to flow through the packing 30 where they contact the sound absorbing packing 30 for further suppressing the sound of the exhaust flow. It has been found that best attenuation or sound suppression efficiency, consistent with engine performance, is achieved when the volume of the packing 30 is in the range of five to eight times the engine displacement.

The chamber 11 is turned or made resonant to the third harmonic by making the length of the longitudinal axis of the entire chamber 11 along which the exhaust flow is directed from the cylinder to the exhaust opening equal to a quarter of a wave length long for effecting tuning of the chamber 11 and since it is an open-ended chamber in the annular area even though the packing 30 is positioned therein, the outlet wave to the atmosphere there is positive. For example, with the 1640 feet per second wave velocity and a wave frequency of 7,000 revolutions or exhaust cycles per minute, the wave length of 14.16 ft./cycle may be determined. A fourth of this length would be 3.7 feet. By tuning the predominantly heavier gases flowing through the flow passage 21 to a dominant harmonic and that of the predominantly ligher gases in the annular area to a third harmonic, the mixing of the negative standing wave flowing from the flow passage 21 is substantially canceled by the standing third harmonic positive wave flowing from the annular area to suppress the sound of the exhaust gases.

The tuned reflected standing wave of the ligher gases will therefore be negative and will be returned adjacent the surface 14 of the casing 10 back to the inlet nozzle 12. As noted previously, the reflected wave of the heavier gases is communicated back to the exhaust port for containing unburnt gases in the cylinder. When the exhaust port closes the initial reflected wave of heavier gases communicated to the inlet opening 12 will be reflected again by the closed outlet port as a positive wave since the system is closed. This rebound flow from the inlet opening 12 will commence to move or flow the gases at rest in the chamber 11 toward the outlet opening 13. As this wave moves from adjacent the exhaust port, the negative standing wave along the inner wall or periphery 14 of the casing 10 tends to reduce the pressure in the portion 11a of the chamber 11 for assisting in extracting the burnt gas when the exhaust port opens for assisting initial exhaust flow from the cylinder through the inlet opening 12 to the chamber 11. Additionally, the negative standing wave prevents the formation of a sonic block by high fregu-ency vibrations in the chamber 11 which would inhibit engine performance by restricting exhaust flow and thus provides greater torque output for the engine over a wider range of operating speeds.

The foregoing disclosure and description of the invention are illustrative and explanatory thereof, and various changes in the size, shape, and materials as well as in the details of the illustrated construction may be made without departing from the spirit of the invention.

What is claimed is:

1. An exhaust control apparatus for an internal combustion engine, including:
    a casing having a chamber formed therein communicating with the exhaust port of an internal combustion engine through an inlet opening for receiving therein the mixture of high and low frequency pressure waves of the exhaust gases of the engine which are vented to the atmosphere through an outlet opening formed through said casing;
    means positioned in said chamber for substantially separating the flow of high frequency pressure waves from the remainder of the exhaust gas pressure wave flow;
    means positioned in said chabmer for sttenuating the sound of the high frequency pressure wave flow wherein the flow of exhaust gas is controlled; and
    said separating means includes a conduit having a flow passage therethrough positioned in said chamber for flowing through said flow passage the remainder of the exhaust gas pressure wave flow and having a surface for turning the flow therethrough to produce a standing wave.

2. The invention set forth in claim 1, wherein:
    said conduit provides a surface for reflecting a portion of the remainder of the exhaust gas pressure wave flow to effect partial internal pressure wave cancellation.

3. The invention as set forth in claim 1, including:
    said chamber having a surface to tune the flow of high frequency pressure waves to a standing wave for effecting mutual pressure wave cancellation when combined with the remainder of the exhaust gas pressure wave flow.

4. The invention as set forth in claim 1, wherein:
    said separating means includes means for flowing a portion of the low frequency pressure waves into the flow of separated high frequency pressure waves for effecting harmonic cancellation of the exhaust gas sound.

5. An exhaust control apparatus for an internal combustion engine, including:
    a casing having a chamber formed therein communicating with the exhaust port of an internal combustion engine through an inlet opening for receiving therein the mixture of high and low frequency pressure waves of the exhaust gases of the engine which are vented to the atmosphere through an outlet opening formed through said casing;
    means positioned in said chamber for substantially separating the flow of high frequency pressure waves from the remainder of the exhaust gas pressure wave flow;
    means positioned in said chamber for attenuating the sound of the high frequency pressure wave flow wherein the flow of exhaust gas is controlled;
    a conduit positioned in said chamber and having a flow passage formed therethrough; and
    said chamber having a progressively increasing flow area for expanding the exhaust gas flow to a lower pressure with said conduit positioned in said chamber to receive the flow of lower frequency pressure waves in said flow passage for flowing therethrough and with the expanded flow of high frequency pressure waves directed into an annular progressively decreasing area of said chamber between said casing and said conduit.

6. The invention as set forth in claim 5, wherein said means for attenuating the sound of the high frequency pressure wave flow includes:
a packing of sound absorbing material positioned in the annular area between said casing and said conduit and which the high frequency pressure wave flow is brought into contact wherein the sound of the high frequency flow is attenuated.

7. A method of controlling the flow of high and low frequency pressure waves of the exhaust gases of an internal combustion engine, including:
substantially separating the flow of high frequency pressure waves from the remainder of the exhaust gas pressure wave flow;
attenuating the sound of the high frequency pressure wave flow wherein the flow of the exhaust gas is controlled;
tuning the high frequency pressure wave flow to produce a standing wave; and
combining the tuned high frequency pressure wave flow with the remainder of the exhaust gas flow to cancel the sound of the exhaust flow.

8. The invention as set forth in claim 7, including:
tuning the remainder of the exhaust gas flow prior to combining with the tuned high frequency pressure wave flow to produce a standing wave.

9. The invention as set forth in claim 7, including:
expanding the exhaust gas flow in separating the high frequency pressure waves for reducing the exhaust gas pressure.

10. The invention as set forth in claim 7, including:
reflecting a portion of the remainder of the exhaust gas pressure wave flow to effect some internal cancellation thereof.

11. The invention as set forth in claim 7, including:
flowing a portion of the low frequency pressure waves into the flow of separated high frequency pressure waves for effecting harmonic cancellation of the exhaust gas sound.

12. A method of controlling the flow of gases of an internal combustion engine, including:
separating the flow of high frequency pressure waves from the remainder of the exhaust gas pressure wave flow;
attenuating the sound of the high frequency pressure wave flow wherein the flow of the exhaust gas is controlled;
tuning the high frequency pressure wave flow to produce a standing wave;
combining the tuned high frequency pressure wave flow with the remainder of the exhaust gas flow to cancel the sound of the exhaust flow;
tuning the remainder of the exhaust gas flow prior to combining with the tuned high frequency pressure wave flow to produce a standing wave; and
tuning the high frequency pressure wave flow to a standing wave having a frequency of three times the frequency of the standing wave of the remainder of the exhaust gas flow for effecting cancellation of the sound waves when the flows are combined.

13. An exhaust control apparatus for an internal combustion engine, including:
a casing having a chamber formed therein for communicating with the exhaust port of an internal combustion engine through an inlet opening for receiving therein the mixture of exhaust gases of the engine which are vented to the atmosphere through an outlet opening formed through said casing;
means with said casing for expanding the mixture of gases so that the ligher portion of the mixture of gases having the greater noise producing high frequency pressure waves expand more rapidly than the heavy portion of the mixture of gases;
means positioned in said chamber for substantially separating the flow of high frequency pressure waves from the remainder of the exhaust gas pressure wave flow;
means positioned in said chamber for attenuating the sound of the high frequency pressure wave flow therein the flow of exhaust gas is controlled; and
a conduit having a flow passage therethrough positioned in said chamber for flowing through said flow passage the remainder of the exhaust gas pressure wave flow and having a surface for tuning the flow therethrogh to produce a standing wave.

14. The invention set forth in claim 13, wherein:
said conduit provides a surface for reflecting a portion of the remainder of the exhaust gas pressure wave flow toward the exhaust port to effect partial internal pressure wave cancellation.

15. The invention as set forth in claim 13, including:
Said chamber having a surface to tune the flow of high frequency pressure waves to standing wave to effecting mutual pressure wave cancellation when combined with the remainder of the exhaust gas pressure wave flow.

16. The invention as set forth in claim 13, wherein said means for separating the flow of high frequency pressure waves includes:
a. a conduit positioned in said chamber and having a flow passage formed therethrough; and
b. said chamber having a progressively increasing flow area for expanding the exhaust gas flow to a lower pressure with said conduit positioned in said chamber to receive the flow of lower frequency pressure waves in said flow passage for flowing therethrough and with the expanded flow of high frequency pressure waves directed into an annular area of said chamber between said casing and said conduit.

17. The invention as set forth in claim 16, wherein said means for attenuating the sound of the high frequency pressure wave flow includes:
a packing of sound absorbing material positioned in the annular area between said casing and said conduit and which the high frequency pressure wave flow is brought into contact wherein the sound of the high frequency flow is attenuated.

18. The invention as set forth in claim 13, wherein:
said separating means includes means for flowing a portion of the low frequency pressure waves into the flow of separated high frequency pressure waves for effecting harmonic cancellation of the exhaust gas sound.

19. A method of controlling the flow of a mixture of gases of an internal combustion engine, including:
expanding the ligher portion of the mixture of gases having the greater noise producing high frequency pressure waves more rapidly than the heavier portion of the mixture of gases having the lower noise producing lower frequency pressure waves during the expansion of the mixture;

substantially separating the flow of high frequency pressure waves from the remainder of the exhaust gas pressure wave flow;

attenuating the sound of the high frequency pressure wave flow wherein the flow of the exhaust gas is controlled;

tuning the high frequency pressure wave flow to produce a standing wave; and combining the tuned high frequency pressure wave flow with the remainder of the exhaust gas flow to cancel the sound of the exhaust flow.

20. The invention as set forth in claim 19, including:
tuning the remainder of the exhaust gas flow prior to combining with the tuned high frequency pressure wave flow to produce a standing wave.

21. The invention as set forth in claim 20, including:
tuning the high frequency pressure wave flow to a standing wave having a frequency of three times the frequency of the standing wave of the remainder of the exhaust gas flow for effecting cancellation of the sound waves when the flows are combined.

22. The invention as set forth in claim 19, including:
expanding the exhaust gas flow in separating the high frequency pressure waves for reducing the exhaust gas pressure.

23. The invention as set forth in claim 19, including:
reflecting a portion of the remainder of the exhaust gas pressure wave flow to effect some internal cancellation thereof.

24. The invention as set forth in claim 19, including:
flow a portion of the low frequency pressure waves into the flow of separated high frequency pressure waves for effecting harmonic cancellation of the exhaust gas sound.

* * * * *